United States Patent [19]
Wienand et al.

[11] Patent Number: 5,955,665
[45] Date of Patent: Sep. 21, 1999

[54] PROCESS FOR MONITORING THE OPERATIVENESS OF A CATALYTIC CONVERTER

[75] Inventors: Karlheinz Wienand, Aschaffenburg, Germany; Joseph R. Griffin, Fenton, Mich.

[73] Assignee: Heraeus Electro-Nite International NV, Belgium

[21] Appl. No.: 09/168,646

[22] Filed: Oct. 8, 1998

[30] Foreign Application Priority Data

Oct. 11, 1997 [DE] Germany ............... 197 45 039

[51] Int. Cl.⁶ .................................................. G01N 27/16
[52] U.S. Cl. .................... 73/118.1; 60/276; 73/23.32; 701/109
[58] Field of Search .............. 60/276, 277; 73/23.31, 73/23.32, 118.1; 701/103, 109

[56] References Cited

U.S. PATENT DOCUMENTS

| | | | |
|---|---|---|---|
| 4,804,632 | 2/1989 | Schuck et al. | 73/23.31 |
| 5,708,585 | 1/1998 | Kushion | 701/109 |
| 5,802,843 | 9/1998 | Kurihara et al. | 60/277 |
| 5,877,413 | 3/1999 | Hamburg et al. | 701/109 |

FOREIGN PATENT DOCUMENTS

| | | |
|---|---|---|
| 37 20 684 A1 | 1/1989 | Germany . |
| 41 00 241 A1 | 7/1991 | Germany . |
| 40 20 383 A1 | 1/1992 | Germany . |

*Primary Examiner*—George Dombroske
*Attorney, Agent, or Firm*—Gerstman, Ellis & McMillin, Ltd.

[57] ABSTRACT

The invention relates to a process for monitoring the operativeness of a catalytic converter used to clean the exhaust gas in an internal combustion engine that is regulated by a lambda sensor through temperature measurement with a heat tone sensor exhibiting a catalytically active coating. The process provides information on both the percentage of individual, non-converted exhaust components and on the current thermal load on the catalytic converter. Readings are taken by the heat tone sensor at time intervals corresponding to the normal regulating frequency of the lambda sensor. This results in a quadratic function in which the height of the amplitude represents the percentage of non-converted individual exhaust components. The mean temperature of the catalytic converter can be inferred by rectifying the quadratic function.

5 Claims, 4 Drawing Sheets

PROCESS FOR MONITORING THE OPERATIVENESS OF A CATALYTIC CONVERTER

FIELD OF THE INVENTION

The invention relates to a process for monitoring the operativeness of a catalytic converter used to clean the exhaust gas in an internal combustion engine that is regulated by a lambda sensor through temperature measurement with a heat tone sensor exhibiting a catalytically active coating, where the exhaust gases on the catalytically active coating experience a conversion related to heat build-up.

BACKGROUND OF THE INVENTION

A generic process is known from DE 37 20 684 A1 in which the combustion enthalpy that occurs in the unprocessed exhaust gas during the after burning of nonburned fuel components is measured. A lambda sensor is arranged behind the heated catalytic converter unit and is linked to the heat regulation system of the catalytic converter. A reference calorific output that occurs when air flows through the system is placed in relation to the reduced calorific output that occurs when combustible exhaust gas components are converted in the catalytic converter unit. Although this process measures the total percentage of nonburned components in the exhaust gas, information on the temperature of the catalytic converter can only be indirectly inferred from the calorific output. The lambda sensor is also used to determine the air-to-fuel ratio. This process can be used to characterize the combustion behavior of the engine.

A process for the protection of catalytic converters used in exhaust gas cleaning is known from DE 40 20 383 A1 in which a heat tone sensor is positioned upstream from the catalytic converter in the exhaust gas flow. The heat tone sensor consists of a resistive temperature sensor with a catalytically active coating. Because the same exothermic reactions take place at this heat tone sensor as in the downstream catalytic converter, this information can be used to determine the percentage of nonburned exhaust gas components. The temperature of the exhaust gas or of the catalytic converter can be measured with a second temperature sensor without a catalytically active coating. The process according to DE 40 20 383 A1 cannot be applied to selectively measure individual exhaust gas components.

The objective of this invention is to provide a process for monitoring the operativeness of a catalytic converter which provides information on both the percentage of individual non-converted exhaust gas components, as well as on the current thermal load on the catalytic converter.

SUMMARY OF THE INVENTION

In accordance with the present invention, a process for monitoring the operativeness of a catalytic converter used to clean the exhaust gas in an internal combustion engine that is regulated by a lambda sensor through temperature measurement with a heat tone sensor including a catalytically active coating is provided. The exhaust gases on the catalytically active coating experience a conversion related to heat build-up, characterized in that readings are initially taken by the heat tone sensor, which is arranged in the exhaust gas flow in the inflow area of the catalytic converter unit and which includes the same catalytically active coating as the catalytic converter unit, at time intervals corresponding to the regulating frequency of the lambda sensor, resulting in a single-amplitude quadratic equation over the time axis, with the height of the amplitude representing a measure for the percentage of non-converted hydrocarbons, carbon monoxide and hydrogen in the exhaust gas, and in that these readings are subsequently (re-) rectified, resulting in a reading for the mean temperature of the catalytic converter unit that includes heat tone.

Internal combustion engines that are regulated by a lambda sensor are characterized by the fact that the composition of the mixture is optimized within the narrowest possible range. The lambda sensor ensures that the air-to-fuel ratio falls within the approximate range of lambda 0.98 to lambda 1.02. Although this optimizes combustion, the exhaust gas flows of such internal combustion engines contain pollutants, such as hydrocarbons, carbon monoxide, hydrogen and nitrogen oxides that must be converted into environmentally compatible substances by means of treatment in a catalytic converter. Simple monitoring of the operativeness of these types of catalytic converters in the exhaust gas cleaning systems of, for example, motor vehicles in operation can be achieved by positioning a heat tone sensor in the exhaust gas flow directly upstream from the catalytic converter unit or in the inflow area of the catalytic converter unit; this heat tone sensor features the same catalytically active coating as the catalytic converter unit itself. The heat tone sensor's readings are taken at time intervals corresponding to the normal regulating frequency of the lambda sensor. The lambda regulating frequency normally ranges from 1 to 3 Hertz. The choice of intervals corresponding to lambda 1 allows for the simultaneous oxidation and/or reduction of hydrocarbons, carbon monoxides, hydrogens (HC, CO, $H_2$) and/or nitrogen oxides ($NO_x$). Both the reduction reaction and the oxidation reaction take place exothermally. However, the heat build-up that takes place during the oxidation reaction (of HC, CO, $H_2$) is significantly greater than that which occurs during the reduction reaction (of $NO_x$). These substantially divergent heat tones can be measured if the measuring signal of the heat tone sensor, which has a catalytically active coating on which the same reactions occur as on that of the catalytic converter itself, is recorded at appropriately short intervals. Ideally, the measured temperature readings represent a quadratic function when plotted against a time axis. However, because of the thermal response over time—during actual measurement—of real temperature sensors, whose reaction time is generally not much faster than the lambda regulating frequency, the ideal quadratic function is not always sharply delineated, but is instead "ground down" to form a constant curve. The quadratic signal is flattened into a line when sensors are used whose reaction time is substantially longer than the lambda regulating frequency, with the height of the amplitude of the quadratic function representing a measure for the percentage of non-converted pollutants in the exhaust gas. If the catalytic converter is fully operational, 92% of heat tone is based on the oxidation of HC, CO and $H_2$, while 8% is based on the reduction of $NO_x$. Using suitable analytical methods, the height of the amplitude can be used to calculate the percentage share of each pollutant group. This results in a characteristic value for the catalytic activity of the catalytic converter coating.

Because of the risk of catalytic converter destruction through overheating, the thermal load on this component represents another indicator for the operativeness of a catalytic converter. Therefore, we are also interested in measuring the absolute temperature of the catalytic converter. The average temperature of the catalytic converter, including any heat tone that occurs, can easily be determined by electronically rectifying the heat tone sensor readings obtained with the method according to the invention. A second temperature sensor, as is known in the art, is not needed here.

In an illustrative embodiment, the addition of a trigger circuit set to the amplitude of the quadratic function for additional determination of lambda has proven to be advantageous for purposes of, for example, readjusting the lambda sensor by trimming.

Advantageously, a heat tone sensor that is suitable for performance of the process consists of a resistance sensor or a thermoelectric cell, where the same catalytically active coating that is applied to the catalytic converter itself is applied over the sensitive layer. Resistance sensors with both negative and positive temperature coefficients are suitable.

To achieve especially short reaction times, it has proven to be advantageous to design the resistance sensor in such a way that it is particularly small and has a low thermal mass. Consequently, the sensitive layer of the heat tone sensor is preferably applied onto a thin carrier using thin-layer technology. In the case of a resistance sensor, the sensitive layer may, for example, consist of platinum. If this platinum layer is also applied to a thin, high temperature resistant membrane, one obtains a resistance sensor with an extremely low thermal mass and, consequently, very short reaction times. In another form of execution, the resistor can also consist of a super-fine wire made of platinum. Analogously, the heat tone sensor can also be constructed as a thin-layer thermoelectric cell, or it can consist of two very thin thermal wires.

Advantageously, the catalytically active coating on the heat tone sensor contains a platinum group metal, such as platinum, rhodium or palladium, or compounds of these metals.

DETAILED DESCRIPTION OF THE ILLUSTRATIVE EMBODIMENT

Figure 1A:
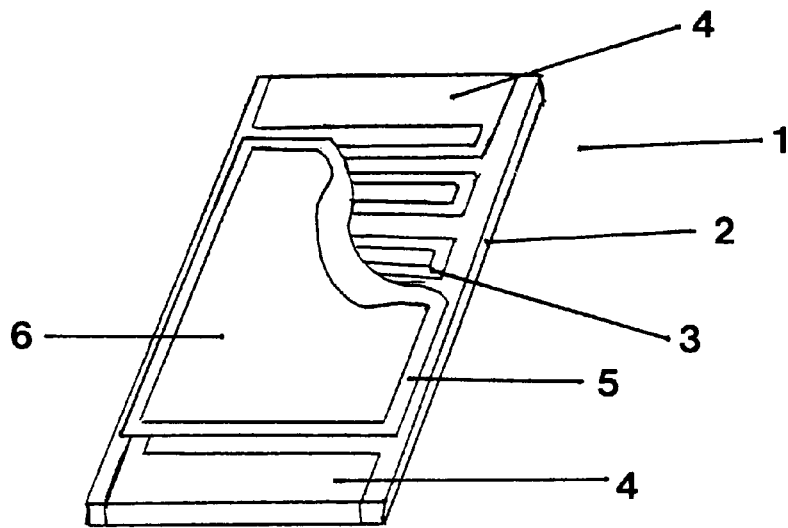
FIGS. 1a, b, c: depict the schematic structure of a heat tone sensor.

According to FIG. 1a, the heat tone sensor 1 includes an electrically insulating substrate 2 made of aluminum oxide. A meander-shaped platinum coating 3 with incoming lines and contact fields 4, which functions as an electrical resistor with positive temperature coefficients, is applied to this carrier. An electrically insulating covering layer 5 made of high temperature-resistant glass or an oxide coating is arranged over the platinum coating 3, with recesses to allow for the contact fields 4. This is covered by the catalytically active coating 6, which consists of the same material as the catalytically active catalytic converter unit, e.g., an aluminum oxide ceroxide-based "washcoat" with a platinum-rhodium impregnation. The electric resistance of the platinum coating 3 of the heat tone sensor 1 changes with the temperature, so that exothermic reactions that take place at the catalytically active coating 6 of the sensor 1 (and, in the same manner, at the catalytically active coating of the catalytic converter) are registered with a high degree of sensitivity.

Figure 1B:
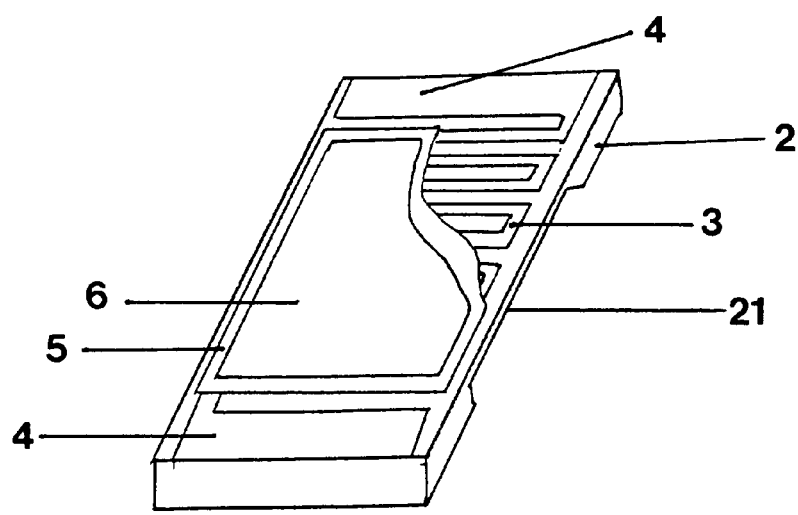
Figure 1C:
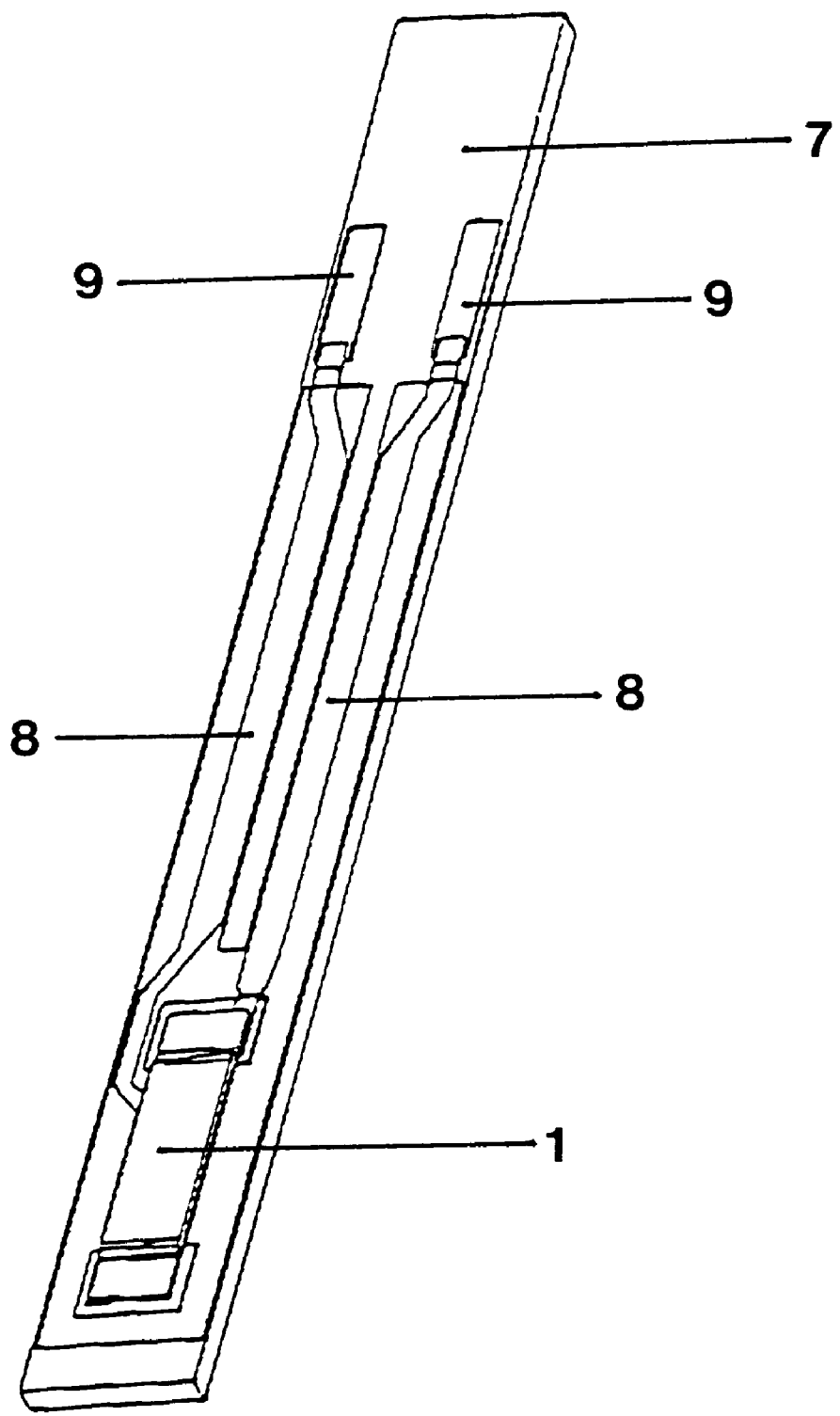

FIG. 1b depicts a form of execution with a very fast reaction time; the functional platinum coating 3 with the corresponding covering layer 5 and catalytically active coating 6 is applied to a very thin (a few μm) membrane 21. In a preferred form of execution, the heat tone sensor 1 shown in FIGS. 1a or 1b is attached to a carrier module 7 using SMD construction methods (see FIG. 1c). This carrier module 7 itself is made of a high temperature resistant, expansion-adjusted material (preferably $Al_2O_3$) and features supply strip conductors 8. These strip conductors terminate in connection pads 9, thus allowing for connection and attachment to a conventional standard casing (FIG. 2).

Figure 2:
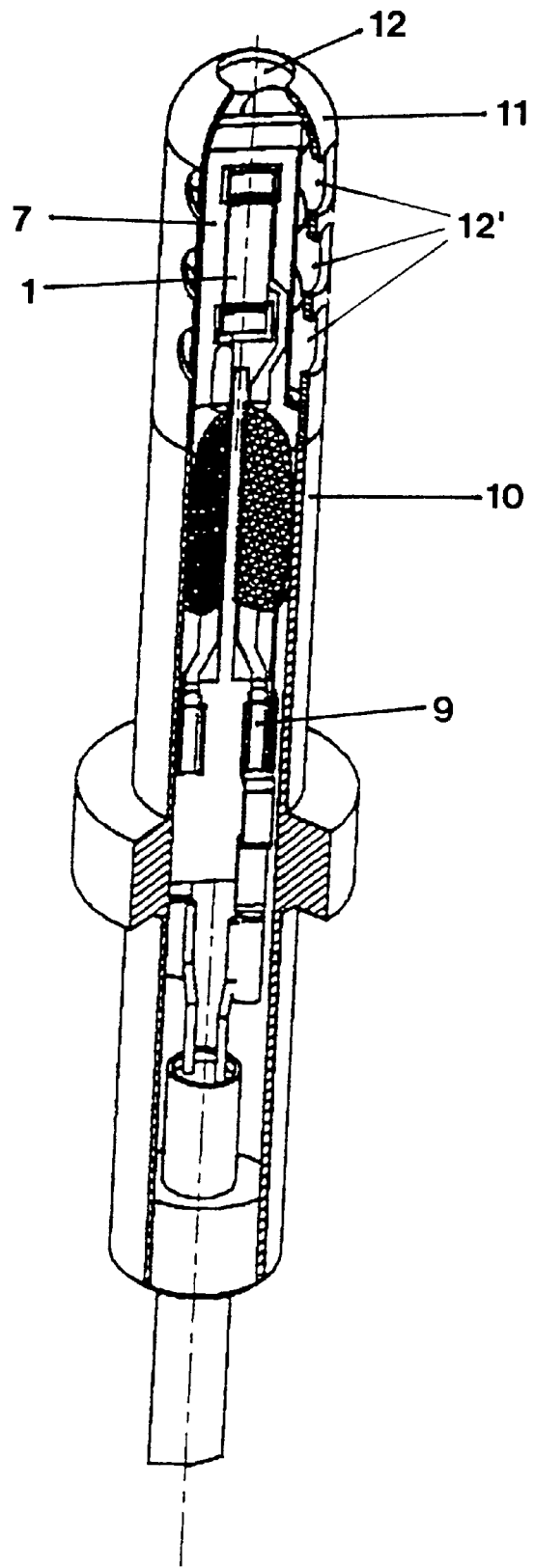
FIG. 2: provides a schematic depiction of the installation of a heat tone sensor into a casing.

FIG. 2 depicts the installation of the carrier module 7 and the heat tone sensor 1 into a casing 10 that can be screwed into the exhaust gas line of an internal combustion engine. The sheath tube tip 11 of the casing 10 has an opening 12 in its tip and lateral perforations 12' to allow for gas access to the heat tone sensor. Once it has been encased in this manner, the sensor is installed into the inflow area of the catalytic converter of a motor vehicle exhaust gas cleaning system with lambda-regulated mixture control. Lambda fluctuates in the range of 0.98 ("saturated" mixture) to 1.02 ("lean" mixture), which allows for the catalytic conversion of HC, CO, $H_2$ and $NO_x$ on the catalytically active coating 6 of the heat tone sensor 1. The heat tone sensor 1 registers the resulting heat tone as a temperature increase at time intervals corresponding to the lambda regulating frequency; this temperature increase follows the progression depicted in FIG. 3.

Figure 3A:
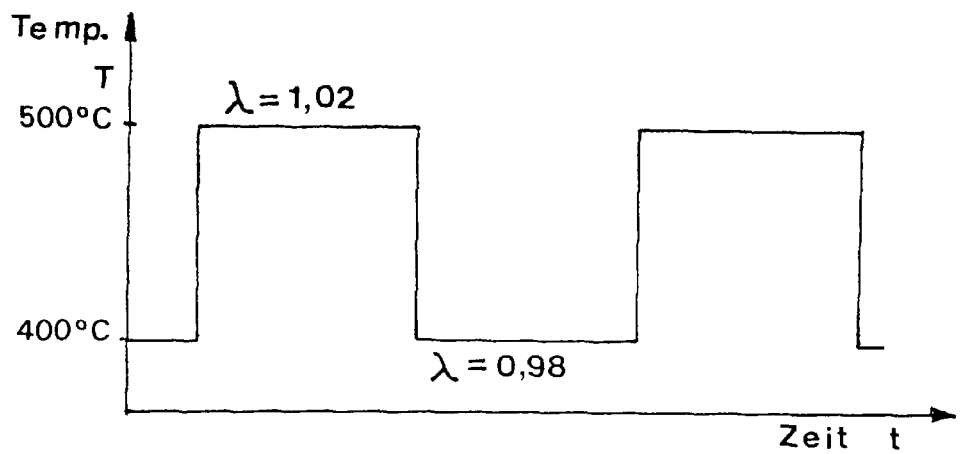
FIGS. 3a, b, c: depict the progression of the heat tone sensor readings against the time axis, as well as the temperature progression following rectification of the function.

FIG. 3a depicts an idealized progression of readings over time. In contrast, FIG. 3b depicts the progression of actual temperature readings taken with a rapid temperature sensor.

Figure 3B:
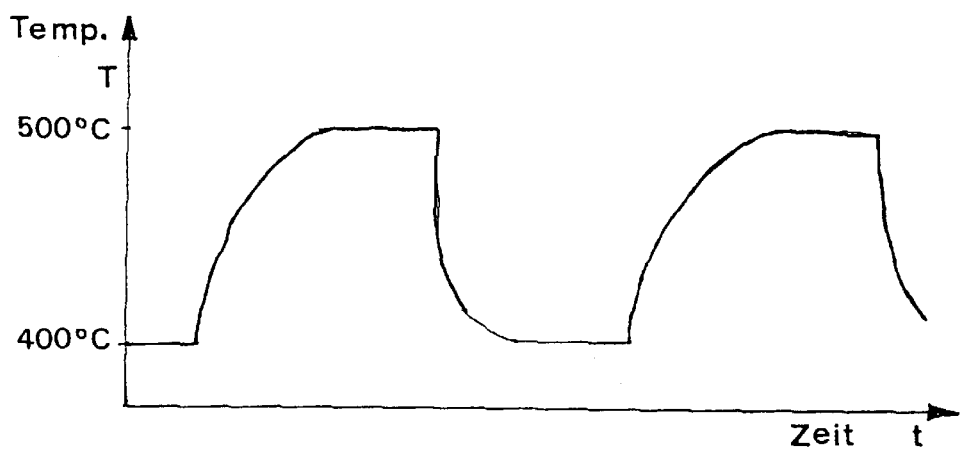
Figure 3C:
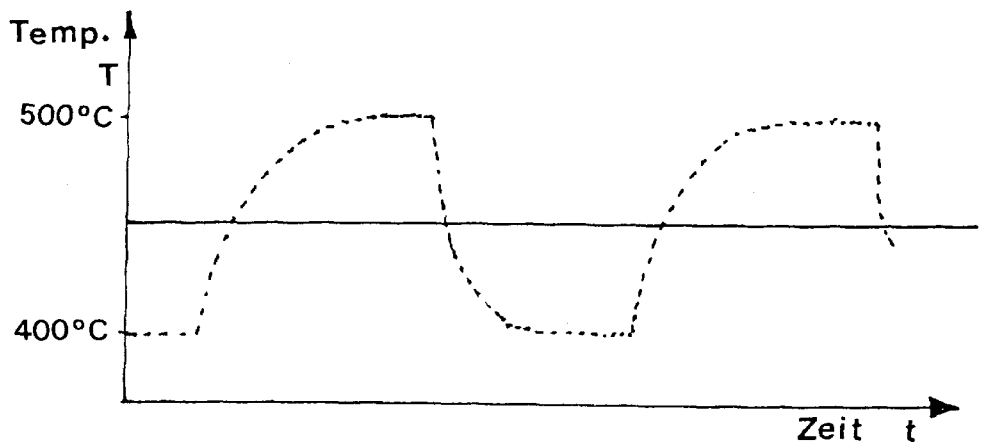

To determine the absolute mean temperature at the catalytic converter, which represents an additional indicator of the operativeness of a catalytic converter, the quadratic function shown in FIG. 3b is electronically rectified. This results in the function shown in FIG. 3c, which can be used to obtain a reading for the applicable absolute temperature at the catalytic converter.

Although an illustrative embodiment of the invention has been shown and described, it is to be understood that various modifications and substitutions may be made by those skilled in the art without departing from the novel spirit and scope of the present invention.

What is claimed:

1. A process for monitoring the operativeness of a catalytic converter used to clean the exhaust gas in an internal combustion engine that is regulated by a lambda sensor through temperature measurement with a heat tone sensor with a catalytically active coating, where the exhaust gases on the catalytically active coating experience a conversion related to heat build-up, characterized in that readings are initially taken by the heat tone sensor, which is arranged in the exhaust gas flow in the inflow area of the catalytic converter unit and which has the same catalytically active coating as the catalytic converter unit, at time intervals corresponding to the regulating frequency of the lambda sensor, resulting in a single-amplitude quadratic equation over the time axis, with the height of the amplitude representing a measure for the percentage of non-converted hydrocarbons, carbon monoxide and hydrogen in the exhaust gas, and that these readings are subsequently rectified, resulting in a reading for the mean temperature of the catalytic converter unit that includes heat tone.

2. A process according to claim 1, characterized in that supplementary monitoring of the lambda values in the exhaust gas is achieved by means of a trigger circuit set to the amplitude of the quadratic function.

3. Heat tone sensor for performance of the process according to claim 1, characterized in that the heat tone sensor is a resistance sensor or a thermocouple, where the resistance sensor or the thermocouple is covered with a catalytically active coating corresponding to that of the catalytic converter unit.

4. Heat tone sensor according to claim 3, characterized in that the heat tone sensor is a resistance sensor with a negative or positive temperature coefficient.

5. Heat tone sensor according to claim 3, characterized in that the catalytically active coating contains a platinum group metal.

\* \* \* \* \*